(12) United States Patent
Yang et al.

(10) Patent No.: US 12,023,763 B2
(45) Date of Patent: Jul. 2, 2024

(54) WELDING DEVICE

(71) Applicant: CONTEMPORARY AMPEREX TECHNOLOGY CO., LIMITED, Ningde (CN)

(72) Inventors: Kun Yang, Ningde (CN); Gang Lin, Ningde (CN); Xiang Fan, Ningde (CN); Tengteng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/132,119

(22) Filed: Apr. 7, 2023

(65) Prior Publication Data

US 2023/0241727 A1    Aug. 3, 2023

Related U.S. Application Data

(63) Continuation of application No. PCT/CN2022/124365, filed on Oct. 10, 2022.

(30) Foreign Application Priority Data

Oct. 13, 2021    (CN) .......................... 202111192761.8

(51) Int. Cl.
*B23K 37/02*          (2006.01)
(52) U.S. Cl.
CPC ...... *B23K 37/0247* (2013.01); *B23K 37/0211* (2013.01)
(58) Field of Classification Search
CPC .............. B23K 37/0247; B23K 37/211; B23K 11/31–318
See application file for complete search history.

(56) References Cited

U.S. PATENT DOCUMENTS 2,236,823 A * 4/1941 Hughes ................ B23K 11/312
219/80
2,441,043 A * 5/1948 Stoudt .................... B23K 11/31
219/86.41
(Continued)

FOREIGN PATENT DOCUMENTS

CN          104044268 A      9/2014
CN          104210708 A     12/2014
(Continued)

OTHER PUBLICATIONS

International Search Report issued Nov. 30, 2022 in International Patent Application No. PCT/CN2022/124365 with English translation thereof, 8 pages.

(Continued)

*Primary Examiner* — Erin B Saad
*Assistant Examiner* — Carlos J Gamino
(74) *Attorney, Agent, or Firm* — XSENSUS LLP

(57) ABSTRACT

Disclosed is a welding device, which includes a drive unit, a first connecting rod, a second connecting rod, a welding head and a welding base. The drive unit is in driving connection to one end of the first connecting rod and one end of the second connecting rod; another end of the first connecting rod is in driving connection to the welding head, and is configured for causing, being driven by the drive unit, the welding head to move in a direction close to or away from the welding base; and another end of the second connecting rod is in driving connection to the welding base, and is configured for causing, being driven by the drive unit, the welding base to move in a direction close to or away from the welding head. The present application can ensure the synchronous movement of the welding head and the welding base.

20 Claims, 9 Drawing Sheets

(56) References Cited

U.S. PATENT DOCUMENTS

| | | | | | |
|---|---|---|---|---|---|
| 2,727,122 | A | * | 12/1955 | Stanley ................. | B23K 11/31 |
| | | | | | 219/86.61 |
| 3,303,316 | A | * | 2/1967 | Bogosian ............... | B23K 11/10 |
| | | | | | 219/86.33 |
| 4,869,419 | A | * | 9/1989 | Nuss .................... | B23K 20/106 |
| | | | | | 228/110.1 |
| 5,063,278 | A | * | 11/1991 | Konno .................. | B23K 11/14 |
| | | | | | 219/86.1 |
| 5,806,362 | A | * | 9/1998 | Dubugnon ........... | B23K 11/314 |
| | | | | | 72/452.8 |
| 2006/0144904 | A1 | * | 7/2006 | Mlinar .................. | B29C 66/41 |
| | | | | | 228/101 |
| 2017/0305129 | A1 | * | 10/2017 | Oorui ................. | B29C 66/1122 |

FOREIGN PATENT DOCUMENTS

| | | |
|---|---|---|
| CN | 206010131 U | 3/2017 |
| CN | 206869301 U | 1/2018 |
| CN | 207668797 U | 7/2018 |
| CN | 108708950 A | 10/2018 |
| CN | 207952921 U | 10/2018 |
| CN | 210648979 U | 6/2020 |
| CN | 211683543 U | 10/2020 |
| CN | 213560504 U | 6/2021 |
| KR | 101341394 B1 | 12/2013 |
| KR | 102277363 B1 | 7/2021 |

OTHER PUBLICATIONS

Written Opinion issued Nov. 30, 2022 in International Patent Application No. PCT/CN2022/124365 with English translation thereof, 6 pages.

Office Action issued Aug. 31, 2023 in Chinese Patent Application No. 202111192761.8 with English translation thereof, 18 pages.

* cited by examiner

WELDING DEVICE

CROSS-REFERENCE TO RELATED APPLICATIONS

The present application is a continuation of PCT Patent Application No. PCT/CN2022/124365, entitled "WELDING DEVICE" filed on Oct. 10, 2022, which claims priority to Chinese Patent Application No. 202111192761.8 entitled "WELDING DEVICE" filed on Oct. 13, 2021, all of which is incorporated herein in its entirety by reference.

TECHNICAL FIELD

The present application relates to the technical field of manufacturing, in particular to a welding device.

BACKGROUND

Welding, also known as fusion welding, is a manufacturing process and technology for bonding metals or other thermoplastic materials (such as plastics) by heating, high temperature or high pressure. At present, the equipment used for welding is mostly equipped with a welding base and a welding head, where the welding base is used to bear two objects to be welded together, and the welding head is used to weld the two objects to be welded together.

When the welding device is in use, it is necessary to move the welding head and welding base first to adjust the positions of them, so as to facilitate the subsequent welding. However, the existing welding device cannot ensure that the welding head and the welding base can be moved simultaneously.

SUMMARY

The present application aims at solving at least one of the technical problems existing in the prior art. To this end, it is an object of the present application to propose a welding device to solve the problem that the welding head and the welding base cannot move synchronously.

In the first aspect, the embodiments of the present application provide a welding device, which includes a drive unit or driver, a first connecting rod, a second connecting rod, a welding head and a welding base. The drive unit is in driving connection to one end of the first connecting rod and one end of the second connecting rod; another end of the first connecting rod is in driving connection to the welding head, and is configured for causing, being driven by the drive unit, the welding head to move in a direction closer to or away from the welding base; and another end of the second connecting rod is in driving connection to the welding base, and is configured for causing, being driven by the drive unit, the welding base to move in a direction closer to or away from the welding head.

In the technical solution of the embodiments of the present application, the drive unit is in driving connection to one end of the first connecting rod and one end of the second connecting rod; another end of the first connecting rod is in driving connection to the welding head, and is configured for causing, being driven by the drive unit, the welding head to move in a direction closer to or away from the welding base; and another end of the second connecting rod is in driving connection to the welding base, and is configured for causing, being driven by the drive unit, the welding base to move in a direction closer to or away from the welding head. With such a design, when the welding device is in use, and it is necessary to move the welding head and the welding base at the same time, the drive unit can drive the first connecting rod and the second connecting rod to move simultaneously, so that the first connecting rod drives the welding head to move in the direction closer to or away from the welding base, and the second connecting rod drives the welding base to move in the direction closer to or away from the welding head, thereby ensuring the simultaneous movement of the welding head and the welding base.

In some embodiments, the welding device further includes a shaping plate; the shaping plate is in driving connection to the another end of the first connecting rod; and the first connecting rod, being driven by the drive unit, drives the welding head and the shaping plate to move. In this way, the drive unit can drive the shaping plate at the same time as it drives the first connecting rod to move the welding head, thus eliminating the need to additionally drive the shaping plate through other parts to save the steps.

In some embodiments, the welding device further includes a first fixing component; and the first fixing component is connected with the another end of the first connecting rod, the welding head and the shaping plate, and the shaping plate and the first fixing component are provided with spacing, the spacing being increased or decreased. In this way, during the process of moving the welding head and the shaping plate simultaneously and using the shaping plate for shaping, the spacing can be reduced to avoid the shaping plate exerting too much pressure on the object to be shaped during shaping and causing damage to the object to be shaped.

In some embodiments, the welding device further includes an elastic member; the elastic member is located between the first fixing component and the shaping plate; and when the spacing is decreased, the elastic member is elastically deformed under extrusion of the first fixing component and the shaping plate.

In some embodiments, the welding device further includes two cams and at least one output shaft being in driving connection to the drive unit and mated with the two cams; and the one end of the first connecting rod and one end of the second connecting rod are connected with one of the two cams. In this way, the drive unit can drive two cams through at least one output shaft to move the first connecting rod and the second connecting rod, thereby moving the welding head and the welding base.

In some embodiments, one output shaft is provided, and the output shaft penetrates through and are fixed to the two cams.

In some embodiments, the welding device further includes a first stationary shaft and two drive rods; the first stationary shaft is axially parallel to the output shaft; the two drive rods are rotatably disposed on the first stationary shaft in a circumferential direction of the first stationary shaft; the two drive rods each include a connecting part and a drive part, and two drive parts are respectively in driving connection to one of the two cams; and one end of the first connecting rod and one end of the second connecting rod are in driving connection to one connecting part. In this way, when the drive unit drives the output shaft and brings the two cams to rotate, each cam can drive a drive rod to rotate circumferentially along the first stationary shaft via a drive part, so as to drive one of the first connecting rod and the second connecting rod to move respectively via two drive rods, and then bring the welding head and the welding base to move.

In some embodiments, the welding device further includes a first fixing component connected with the another end of the first connecting rod and the welding head; and a second fixing component connected with the another end of the second connecting rod and the welding base. In this way, when the drive unit drives the first fixing component to move via the first connecting rod, the welding head can be moved, and when the drive unit drives the second fixing component to move via the second connecting rod, the welding base can be moved.

In some embodiments, the welding device further includes a first supporting component; when the welding head moves in a direction close to closer to the welding base, the first support component moves to a preset position and abuts against the first fixing component to prevent the welding head from moving in a direction away from the welding base. In this way, after the drive unit drives the first fixing component to move via the first connecting rod, so as to bring the welding head to move, the welding head can be prevented from moving in the direction away from the welding base by the first supporting component, so as to improve the stability of the welding head while welding.

In some embodiments, the welding device further includes a third connecting rod; and the third connecting rod is in driving connection to the drive unit and the first supporting component, and is configured for causing, being driven by the drive unit, the first supporting component to move. In this way, the drive unit can drive the second fixing component to move via the third connecting rod while driving the first fixing component to move via the first connecting rod, so as to bring the welding head to move.

In some embodiments, the welding device further includes a positioning bracket fixed to the drive unit; the first supporting component includes: a first guide rail fixed on the positioning bracket, and a first supporting piece slidably arranged on the first guide rail and in driving connection to an end portion of the third connecting rod; and the third connecting rod is configured for driving the first supporting piece to slide on the first guide rail and bringing the first supporting piece against the first fixing component. In this way, the drive unit can drive the first supporting piece to slide on the first guide rail via the third connecting rod, and when the drive unit moves the first fixing component via the first connecting rod to move the welding head, the first supporting component is made to abut against the first fixing component to prevent the welding head from moving in the direction away from the welding base, thereby improving the stability of the welding head and the shaping plate when the welding head is being welded.

In some embodiments, the first supporting component further includes: a second stationary shaft fixed on the positioning bracket; and an articulated connecting rod rotatably disposed on the second stationary shaft in a circumferential direction of the second stationary shaft, and opposite ends of the articulated connecting rod being respectively connected with one of the third connecting rod and the first supporting piece. In this way, the drive unit can drive the articulated connecting rod through the third connecting rod to rotate circumferentially along the second stationary shaft to slide the first supporting piece on the first guide rail through the articulated connecting rod, so that the first supporting piece can abut the first fixing component and prevent the welding head from moving in the direction away from the welding base.

In some embodiments, the welding device further includes a second supporting component; when the welding base moves in a direction closer to the welding head, the second supporting component moves to a preset position and abuts against the second fixing component to prevent the welding base from moving in a direction away from the welding head. In this way, after the drive unit drives the second fixing component to move via the second connecting rod, so as to bring the welding base to move, the welding base can be prevented from moving in the direction away from the welding head by the second supporting component, so as to improve the stability of the welding base while the welding heat is being welded.

In some embodiments, the welding device further includes a fourth connecting rod; the fourth connecting rod is in driving connection to the drive unit and the second supporting component, and is configured for causing, being driven by the drive unit, the second supporting component to move. In this way, the drive unit can drive the second fixing component to move via the fourth connecting rod while driving the second fixing component to move via the second connecting rod so as to bring the welding base to move.

In some embodiments, the welding device further includes a positioning bracket fixed to the drive unit; the second supporting component includes: a second guide rail fixed on the positioning bracket, and a second supporting piece slidably arranged on the second guide rail and in driving connection to an end portion of the fourth connecting rod; and the fourth connecting rod is configured for driving the second supporting piece to slide on the second guide rail and bringing the second supporting piece against the second fixing component. In this way, the drive unit can drive the second supporting component to slide on the second guide rail via the fourth connecting rod, and when the drive unit moves the second fixing component via the second connecting rod to move the welding base, the second supporting component is made to abut against the second fixing component to prevent the welding base from moving in the direction away from the welding head, thereby improving the stability of the welding base when the welding head is being welded.

In some embodiments, the second supporting component further includes a first staging connecting rod, a second staging connecting rod, and a drive shaft; the second supporting piece is provided with a third guide rail, and an extension direction of the third guide rail intersects with an extension direction of the second guide rail; one end of the first staging connecting rod and one end of the second staging connecting rod are fixed with the drive shaft, another end of the first staging connecting rod is in driving connection to an end portion of the fourth connecting rod, and another end of the second staging connecting rod is slidably arranged on the third guide rail; and the drive shaft is rotatably arranged on the positioning bracket in a circumferential direction of the positioning bracket. In this way, the drive unit can drive the first staging connecting rod to rotate circumferentially along the drive shaft via the fourth connecting rod, and drive the second staging connecting rod via the drive shaft to rotate circumferentially along the drive shaft, and slide on third guide rail by means of the other end of the second staging connecting rod, causing the second supporting piece to slide on the second guide rail, thereby allowing the second supporting piece to abut the second fixing component and preventing the welding base from moving in a direction away from the welding head.

In some embodiments, the welding device further includes a cylinder coupled to the welding head and configured for driving the welding head to move in a direction closer to or away from the welding base; and the another end of the first connecting rod is in driving connection to the cylinder and is configured for driving the cylinder and the welding head to move. In this way, when the welding device is in use, and after the drive unit drives both the welding head and the welding base to move, the welding head can be driven by the cylinder to weld the object to be welded.

In some embodiments, the welding device further includes a positioning bracket and a fourth guide rail fixed to the positioning bracket; and the cylinder is slidably arranged on the fourth guide rail and capable of sliding, being driven by the first connecting rod, on the fourth guide rail. In this way, when the drive unit drives the cylinder to move through the first connecting rod, it enables the cylinder to move on the fourth guide rail to improve the stability of the cylinder when it moves.

In some embodiments, the welding device further includes a cylinder fixing piece and a fifth guide rail; the cylinder fixing piece is slidably arranged on the fourth guide rail, and the cylinder fixing piece is in driving connection to the another end of the first connecting rod; the fifth guide rail is fixed on the cylinder fixing piece; the welding head is slidably arranged on the fifth guide rail; and the cylinder is fixed on the cylinder fixing piece and is configured for driving the welding head to slide on the fifth guide rail. In this way, when the cylinder drives the welding head to move in the direction closer to or away from the welding base, it enables the welding head to move on the fifth guide rail to improve the stability of the welding head when it moves.

In some embodiments, the welding device further includes a positioning bracket and a sixth guide rail fixed to the positioning bracket; the welding base is slidably arranged on the sixth guide rail and capable of sliding, being driven by the second connecting rod, on the sixth guide rail. In this way, when the drive unit drives the welding base to move through the second connecting rod, it enables the welding base to move on the sixth guide rail to improve the stability of the welding base when it moves.

In some embodiments, the welding device further includes a transmission connecting rod, a drive connecting rod, a positioning bracket, and a third stationary shaft fixed to the positioning bracket; the transmission connecting rod is rotatably arranged on the third stationary shaft in a circumferential direction of the third stationary shaft; two ends of the drive connecting rod are respectively in driving connection to one of the transmission connecting rod and the drive unit; and one end of the first connecting rod or one end of the second connecting rod is connected with the transmission connecting rod. In this way, when the drive unit drives the drive connecting rod to move, it drives the transmission connecting rod to rotate circumferentially along the third stationary shaft and drives the first connecting rod or the second connecting rod to move via the transmission connecting rod, thereby driving the welding head or welding base to move.

The above description is only an overview of the technical solution of the present application. In order to better understand the technical means of the present application, it can be practiced in accordance with the contents of the description, and in order to make the above and other objects, features and advantages of the present application more apparent and easy to understand, the specific embodiment of the present application is set forth below.

BRIEF DESCRIPTION OF DRAWINGS

In the accompanying drawings, unless otherwise specified, the same reference signs throughout the plurality of accompanying drawings indicate identical or similar parts or elements. These drawings are not necessarily drawn to scale.

It should be understood that these drawings depict only some embodiments disclosed in accordance with the present application and should not be construed as limiting the scope of the present application.

Illustrations of reference signs.

Figure 1:
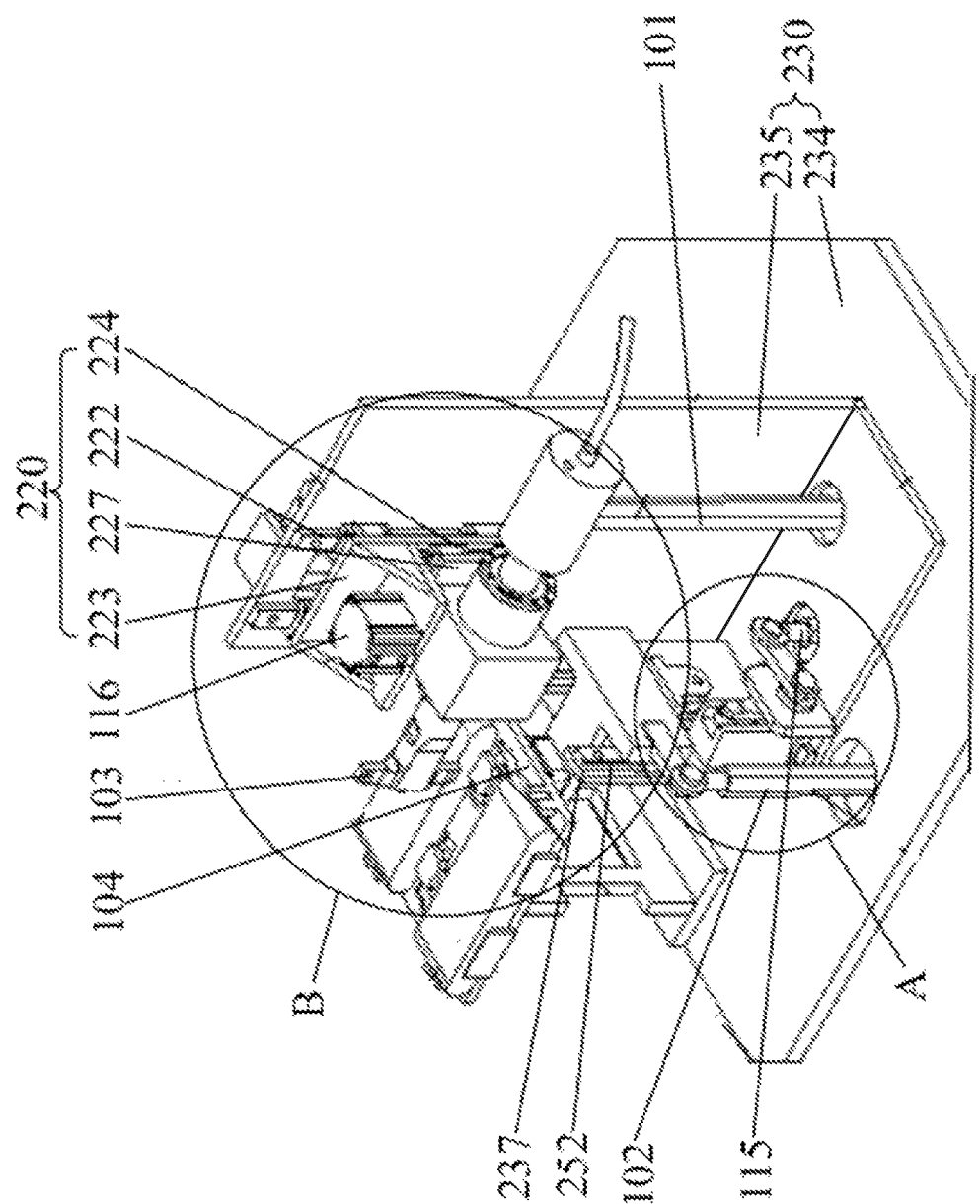
FIG. 1 is a structural schematic diagram of a part of a welding device according to some embodiments of the present application.

first connecting rod 101, second connecting rod 102, welding head 103, welding base 104, shaping plate 105. elastic member 106, cam 107, output shaft 108, first stationary shaft 109, drive rod 110, connection part 111, drive part 112, tension spring 113, third connecting rod 114, fourth connecting rod 115, cylinder 116, transmission connecting rod 117, drive connecting rod 118, and third stationary shaft 119;

drive unit 210, motor 211, synchronous belt 212;

first fixing component 220, welding head supporting roller 221, fourth guide rail 222, cylinder fixing piece 223, fifth guide rail 224, welding head fixing piece 225, shaping plate fixing piece 226, and fixing upright plate 227; positioning bracket 230, output shaft fixing piece 231, first stationary shaft fixing piece 232, bottom plate 233, upper plate 234, first side plate 235, fixing seat 236, second side plate 237, and supporting seat 238;

first supporting component 240, first guide rail 241, first supporting piece 242, second stationary shaft 243, articulated connecting rod 244;

second fixing component 250, welding base support roller 251, sixth guide rail 252, and welding base fixing piece 253;

second supporting component 260, second guide rail 261, second supporting piece 262, first staging connecting rod 263, second staging connecting rod 264, drive shaft 265, and third guide rail 266.

DETAILED DESCRIPTION OF EMBODIMENTS

Embodiments of the technical solution of the present application will be described in detail with reference to the accompanying drawings. The following embodiments are only intended to more clearly illustrate the technical solutions of the present application and are therefore intended as examples only and are not intended to limit the scope of protection of the present application.

Unless otherwise defined, all technical and scientific terms used herein have the same meanings as are commonly understood by those skilled in the art of the present application. Terms used herein are for the purpose of describing specific embodiments only and are not intended to limit the application. The terms "comprising" and "having" and any variations thereof in the description and claims of the present application and the above description of the drawings are intended to cover non-exclusive inclusion.

In the description of embodiments of the present application, the technical terms "first," "second" and the like are used only to distinguish different objects and are not understood to indicate or imply relative importance or to imply the number, specific order or primary and secondary relationship of the indicated technical features. In the description of embodiments of the present application, "plurality" means more than two, unless expressly specified otherwise.

"Embodiments" referred to in the present application means that a particular feature, structure, or characteristic described in connection to embodiments is included in at least one embodiment of the present application. The presence of the phrase in various places in the description does not necessarily mean the same embodiment, nor is it a separate or alternative embodiment that is mutually exclusive with other embodiments. It is explicitly and implicitly understood by those skilled in the art that the embodiments described herein may be combined with other embodiments.

In the description of embodiments of the present application, the term "and/or" herein is simply a description of the association relationship of the associated objects, indicating that three relationships can exist, for example, A and/or B may indicate that A exists alone, A and B exist at the same time, and B exists alone. In addition, the character "/" herein generally means that the associated objects are in an "or" relationship.

In the description of the embodiments of the present application, "multiple" refers to more than two (including two). Likewise, "multiple groups" refers to more than two (including two) groups, and "multiple pieces" refers to more than two (including two) pieces.

In the description of the embodiments of the present application, it should be understood that orientation or positional relationships indicated by terms such as "center," "longitudinal," "transverse," "length," "width," "thickness," "up," "down," "front," "back," "left," "right," "vertical," "horizontal," "top," "bottom," "inner," "outer," "clockwise," "counterclockwise," "axial," "radial," "circumferential," etc. are based on the orientation or positional relationships shown in the drawings, for ease of description of the embodiments of the present application and simplification of the description only, these terms do not indicate or imply that the apparatus or element referred to must have a specific orientation or be constructed and operated in a specific orientation, and therefore cannot be construed as limitations to the embodiments of the present application.

In the present disclosure, unless otherwise explicitly provided and limited, the terms such as "mount," "connect," "couple," and "fix" should be understood broadly, which, for example, may refer to a fixed connection, a detachable connection, or an integral connection; which may refer to a mechanical connection or an electrical connection; which may refer to a direct connection or an indirect connection via an intermediate medium; which may also refer to a communication between the insides of two elements. To a person of normal skill in the art, specific meanings of the above terms in the present disclosure may be construed as dependent on specific situations.

Welding, also known as fusion welding, is a manufacturing process and technology for bonding metals or other thermoplastic materials (such as plastics) by heating, high temperature or high pressure. At present, the equipment used for welding is mostly equipped with a welding base and a welding head, where the welding base is used to bear two objects to be welded together, and the welding head is used to weld the two objects to be welded together.

The applicant notes that when the welding device is in use, it is necessary to move the welding head and welding base first to adjust the positions of the welding head and welding base, so as to facilitate the subsequent welding. However, the existing welding device cannot ensure that the welding head and the welding base can be moved simultaneously.

In order to ensure the simultaneous movement of the welding head and the welding base, after in-depth study, a welding device is designed. With such a design, when the welding device is in use, it is necessary to move the welding head and the welding base at the same time, and the drive unit can drive the first connecting rod and the second connecting rod to move simultaneously, so that the first connecting rod drives the welding head to move in the direction closer to or away from the welding base, and the second connecting rod drives the welding base to move in the direction closer to or away from the welding head, thereby ensuring simultaneous movement of the welding head and the welding base.

Figure 2:
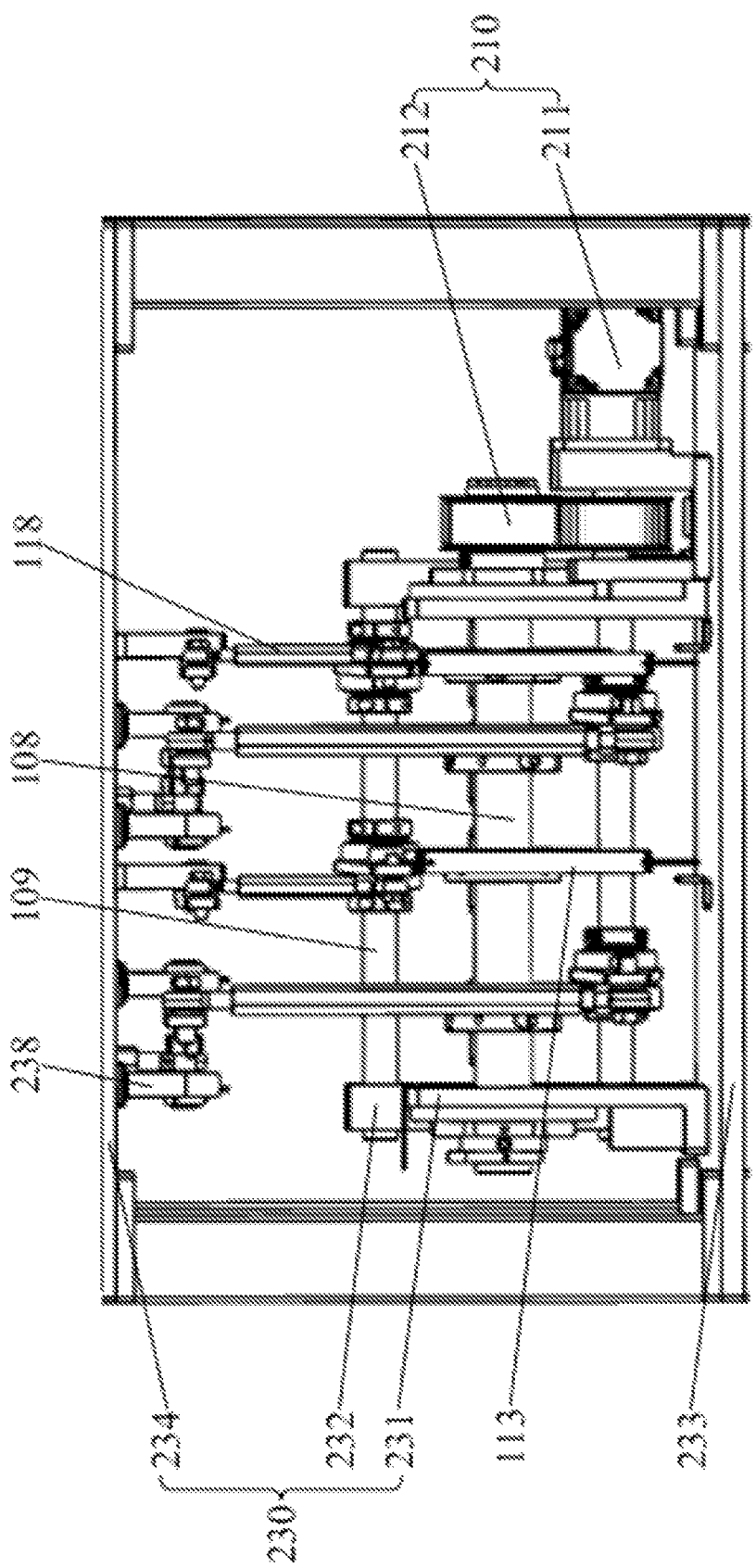
FIG. 2 is a structural schematic diagram of another part of a welding device according to some embodiments of the present application.

According to some embodiments of the present application, referring to FIGS. 1 and 2, the present application provides a welding device including a drive unit or a driver 210, a first connecting rod 101, a second connecting rod 102, a welding head 103, and a welding base 104. The drive unit 210 is connected to one end of the first connecting rod 101 and one end of the second connecting rod 102. Another end of the first connecting rod 101 is connected with the welding head 103, and is used to drive the welding head 103 to move in a direction closer to or away from the welding base 104 under the drive of the drive unit 210. Another end of the second connecting rod 102 is in driving connection to the welding base 104, and is configured for causing, being driven by the drive unit 210, the welding base 104 to move in a direction closer to or away from the welding head 103.

In an embodiment, when the welding device is used and before the welding device welds the object to be welded, the first connecting rod 101 drives the welding head 103 to move in a direction closer to the welding base 104 under the drive of the drive unit 210, and the second connecting rod 102 drives the welding base 104 to move in a direction closer to the welding head 103 under the drive of the drive unit 210, so that the welding head 103 and the welding base 104 move in a direction closer to each other, and the distance between the welding head 103 and the welding base 104 is reduced, so as to facilitate subsequent welding.

In another embodiment, when the welding device is used and before the welding device welds the object to be welded, the first connecting rod 101 drives the welding head 103 to move in a direction away from the welding base 104 under the drive of the drive unit 210, and the second connecting rod 102 drives the welding base 104 to move in a direction closer to the welding head 103 under the drive of the drive unit 210, and the displacement of the welding base 104 moving is larger than the displacement of the welding head 103, so as to reduce the distance between the welding head 103 and the welding base 104 to facilitate subsequent welding.

It should be noted that, when the welding device provided in the present application is in use and before welding the object to be welded, the direction in which the drive unit 210 drives the welding head 103 to move and the direction in which the drive unit drives the welding base 104 to move are not limited, as long as the drive unit 210 can ensure that the welding head 103 and the welding base 104 move simultaneously, so as to facilitate subsequent welding.

When the welding device provided by the embodiment of the present application is in use, the welding head 103 and the welding base 104 need to be moved simultaneously, the first connecting rod 101 and the second connecting rod 102 can be driven simultaneously by the drive unit 210 to move the welding head 103 in a direction closer to or away from the welding base 104 via the first connecting rod 101 and the welding base 104 in a direction closer to or away from the welding head 103 via the second connecting rod 102, thereby ensuring that the welding head 103 and the welding base 104 move synchronously.

Figure 3:
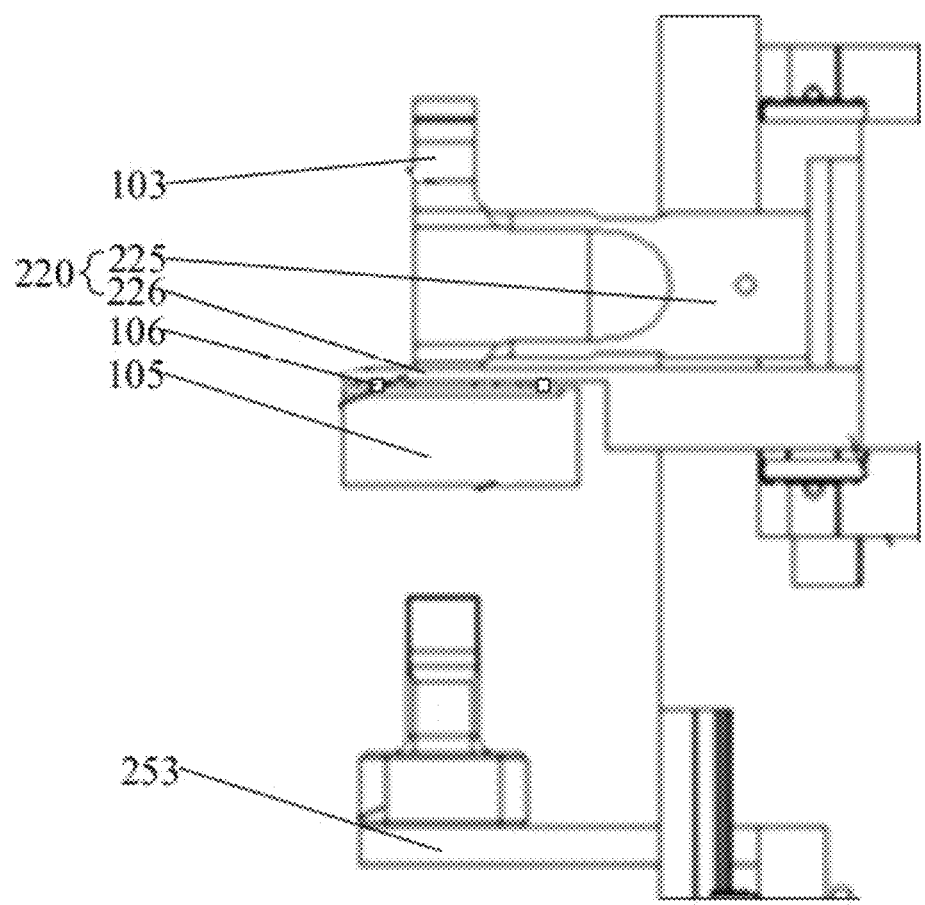
FIG. 3 is a structural schematic diagram of a welding head, a shaping plate and a welding base mating with each other according to some embodiments of the present application.
Figure 4:
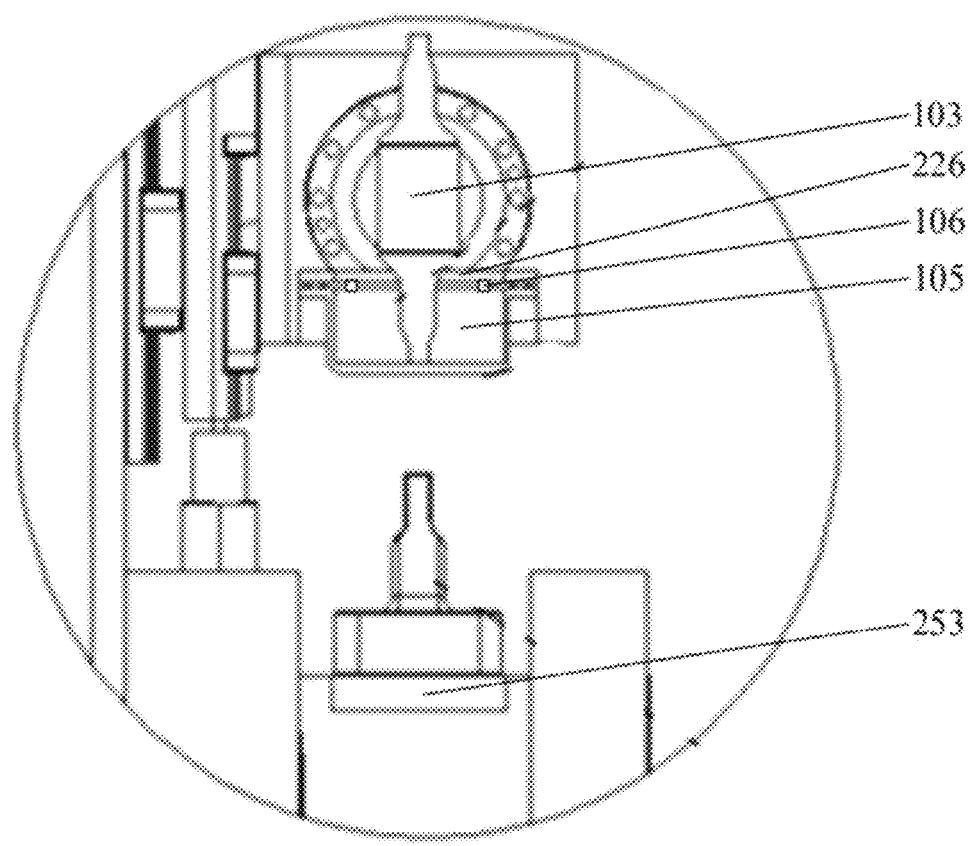
FIG. 4 is a structural schematic diagram of the welding head, shaping plate and welding base mating with each other in another perspective some embodiments of the present application.

Referring to FIGS. 3 and 4, according to some embodiments of the present application, the welding device further includes a shaping plate 105. The shaping plate 105 is in driving connection to another end of the first connecting rod 101. The first connecting rod 101 moves the welding head 103 and the shaping plate 105 under the drive of the drive unit 210.

In this way, the drive unit 210 can drive the shaping plate 105 to move while driving the first connecting rod 101 to move, so as to drive the welding head 103 to move, so that there is no need to drive the shaping plate 105 to move by other parts, thus saving the step sequence.

Specifically, the shaping plate 105 is used for shaping the object to be welded. In one example, the object to be welded is a conductive structure and a plurality of cells, and the welding device is used for electrically connecting the conductive structure and the plurality of cells. At this time, the shaping plate 105 is used for shaping the plurality of cells to ensure that the plurality of cells are arranged in order. The conductive structure can be a bus bar and the like.

In some embodiments, the corners of the shaping plate 105 are chamfered, and the surface of the shaping plate 105 is coated with a smooth coating such as a Teflon coating or a ceramic coating, so as to prevent the shaping plate 105 from being scratched and damaged by an object to be shaped when the shaping plate 105 is treated with an object to be shaped.

According to some embodiments of the present application, the welding device further includes a first fixing component or a first fixer 220. The first fixing component 220 is connected to another end of the first connecting rod 101 and the welding head 103. In one embodiment, the first fixing component 220 is connected with another end of the first connecting rod 101, the welding head 103 and the shaping plate 105. The shaping plate 105 has a spacing between the first fixing component 220, and the spacing can be increased or decreased.

In the above embodiment, when the drive unit 210 simultaneously drives the welding head 103 and the shaping plate 105 through the first connecting rod 101, and the shaping plate 105 is used for shaping, the first fixing component 220 and the shaping plate 105 can squeeze the elastic member 106 by reducing the spacing, so as to prevent the shaping plate 105 from exerting excessive pressure on the shaping object during shaping, resulting in damage to the shaping object.

According to some embodiments of the present application, the welding device further includes an elastic member or an elastic structure 106. The elastic member 106 is located between the first fixing component 220 and the shaping plate 105. When the spacing is reduced the elastic member 106 is elastically deformed by the pressing of the first fixing piece 220 and the shaping plate 105.

In some embodiments, the reaction force applied by the object to be shaped to the shaping plate 105 when the spacing is reduced may also be adjusted by replacing the elastic members 106 having different modulus of elasticity.

In some embodiments, the welding device further includes a pin (not shown) by which the first fixing component 220 is fixed to the shaping plate 105 so that the spacing between the first fixing component 220 and the shaping plate 105 can be increased or decreased, and an elastic member 106 is disposed adjacent to the pin and between the first fixing component 220 and the shaping plate 105. The number of pins may be four, and the number of elastic members 106 may be four, each of which is disposed adjacent to one pin, and the elastic members 106 may be springs or the like.

Figure 5:
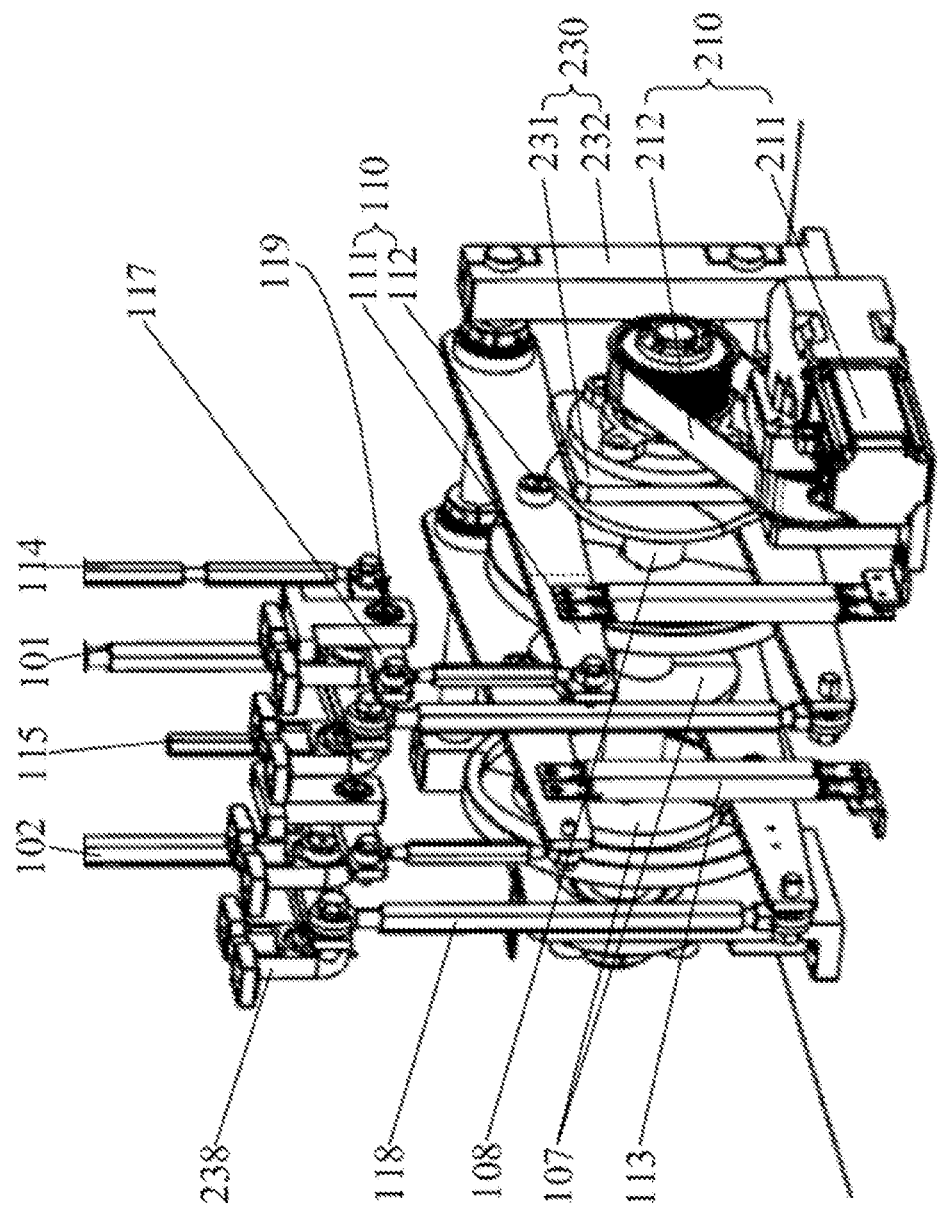
FIG. 5 is a structural schematic view from another perspective of another part of the welding device according to some embodiments of the present application.

With continued reference to FIG. 2 and in conjunction with FIG. 5, according to some embodiments of the present application, the welding device further includes two cams 107 and at least one output shaft 108 in drive connection to the drive unit 210 and mating with the two cams 107. One end of the first connecting rod 101 and one end of the second connecting rod 102 are both connected to one cam 107.

In this way, the drive unit 210 can drive the two cams 107 to rotate through at least one output shaft 108, so as to drive the first connecting rod 101 and the second connecting rod 102 to move, and then drive the welding head 103 and the welding base 104 to move.

In one embodiment, both the cam 107 and the output shaft 108 are made of carbon steel, and the working surfaces of the cam 107 and the output shaft 108 are heat treated and polished, so that the cam 107 and the output shaft 108 can withstand periodic impact loads.

According to some embodiments of the present application, the number of output shafts 108 is one and the output shafts 108 penetrate and are fixed to the two cams 107. Thus, it is ensured that the output shaft 108 can rotate the two cams 107 under the drive of the drive unit 210. Specifically, the output shaft 108 can be fixed to the cam 107 by a key.

Specifically, in one example, the drive unit 210 includes a motor 211, a synchronous belt 212, and two synchronous belt pulleys (not shown). The output end of the motor 211 is in driving connection to one synchronous pulley, and the synchronous pulley is in driving connection to another synchronous pulley via the synchronous belt 212, and the other synchronous pulley is fixed to the output shaft 108, so that the motor 211 can drive output shaft 108 to rotate via the two synchronous pulleys and the synchronous belt. The motor 211 may be in driving connection to the synchronous pulley via a reducer (not shown) and may be a servo motor. In one embodiment, the servo motor has a right-angle reducer to ensure that the starting torque of the motor 211 is not too large, and at the same time, the rotation angle of the motor 211 is more accurate.

According to some embodiments of the present application, the welding device further includes a first stationary shaft 109 and two drive rods 110. The first stationary shaft 109 is axially parallel to the output shaft 108. The two drive rods 110 are rotatably disposed on the first stationary shaft 109 in a circumferential direction of the first stationary shaft 109. The two drive rods 110 each include a connecting part 111 and a drive part 112, and two drive parts 112 are in driving connection to one of the two cams 107. One end of the first connecting rod 101 and one end of the second connecting rod 102 are both connected to one connecting part 111.

In one embodiment, the drive rod 110 is sleeved on the first stationary shaft 109, and the diameter of the first stationary shaft 109 is larger, so as to increase the contact area between the drive rod 110 and the first stationary shaft 109, thereby improving the stability of the drive rod 110 when rotating along the circumferential direction of the first stationary shaft 109.

In this the above embodiments, when the drive unit 210 drives the output shaft 108 and brings the two cams 107 to rotate, each cam 107 can drive one drive rod 110 to rotate circumferentially along the first stationary shaft 109 via the drive part 112, so as to drive one of the first connecting rod 101 and the second connecting rod 102 to move via two drive rods 110, and then bring the welding head 103 and the welding base 104 to move. Specifically, in one example, the drive part 112 is located between the connecting part 111 and the first stationary shaft 109. In another example, the connecting part 111 is located between the drive part 112 and the first stationary shaft 109.

In one embodiment, the cam 107 in driving connection to the drive part 112 is a force-closed type cam, and the drive part 112 abuts against an outer surface of the cam 107. In this case, the welding device may further include a tension spring 113. The tension spring 113 is connected to the transmission rod 110 and used for pulling the transmission rod 110 in a direction closer to the cam 107 to ensure that the drive part 112 abuts against the outer wheel surface of the cam 107. For example, the drive part 112 has bearing rollers, and the bearing rollers come into contact with the outer surface of the cam 107 to reduce friction between the drive part 112 and the cam 107. For another example, the tension springs 113 are double tension springs 113, that is, each tension spring 113 has two tension springs, so as to increase the tension force of the tension springs 113 on the transmission rod 110 and further ensure that the drive part 112 abuts against the outer surface of the cam 107.

In yet another embodiment, the cam 107, which is in driving connection to the drive part 112, is a closed type cam, the cam 107 is provided with an inner groove, and the drive part 112 is slidably provided in the inner groove so that the cam 107 is in driving connection to the transmission rod 110. For example, the inner groove of the cam 107 is exposed to the outside, thereby facilitating subsequent lubrication and spot check maintenance of the cam 107 in the welding device.

In some embodiments, the welding device further includes a positioning bracket 230 fixed to the drive unit 210. In an embodiment, the output shaft 108 is rotationally disposed on the positioning bracket 230, and the first stationary shaft 109 is fixed on the positioning bracket 230. Specifically, the positioning bracket 230 includes two opposite output shaft fixing pieces 231, and both ends of the output shaft 108 are respectively rotatable on one output shaft fixing piece 231. In addition, the positioning bracket 230 also includes two first stationary shaft fixing pieces 232 disposed opposite to each other, and both ends of the first stationary shaft 109 are respectively fixed to one of the first stationary shaft fixing pieces 232. More specifically, the positioning bracket 230 also includes a bottom plate 233. The output shaft fixing piece 231 and the first stationary shaft fixing piece 232 are fixed to the bottom plate 233, and the motor 211 in the drive unit 210 is also fixed to the bottom plate 233. In one example, there is also a double row angular contact ball bearing (not shown) between the end of the output shaft 108 provided with a synchronous pulley and the output shaft fixing member 231, which is used to withstand the radial load and the axial load of the output shaft 108.

Figure 8:
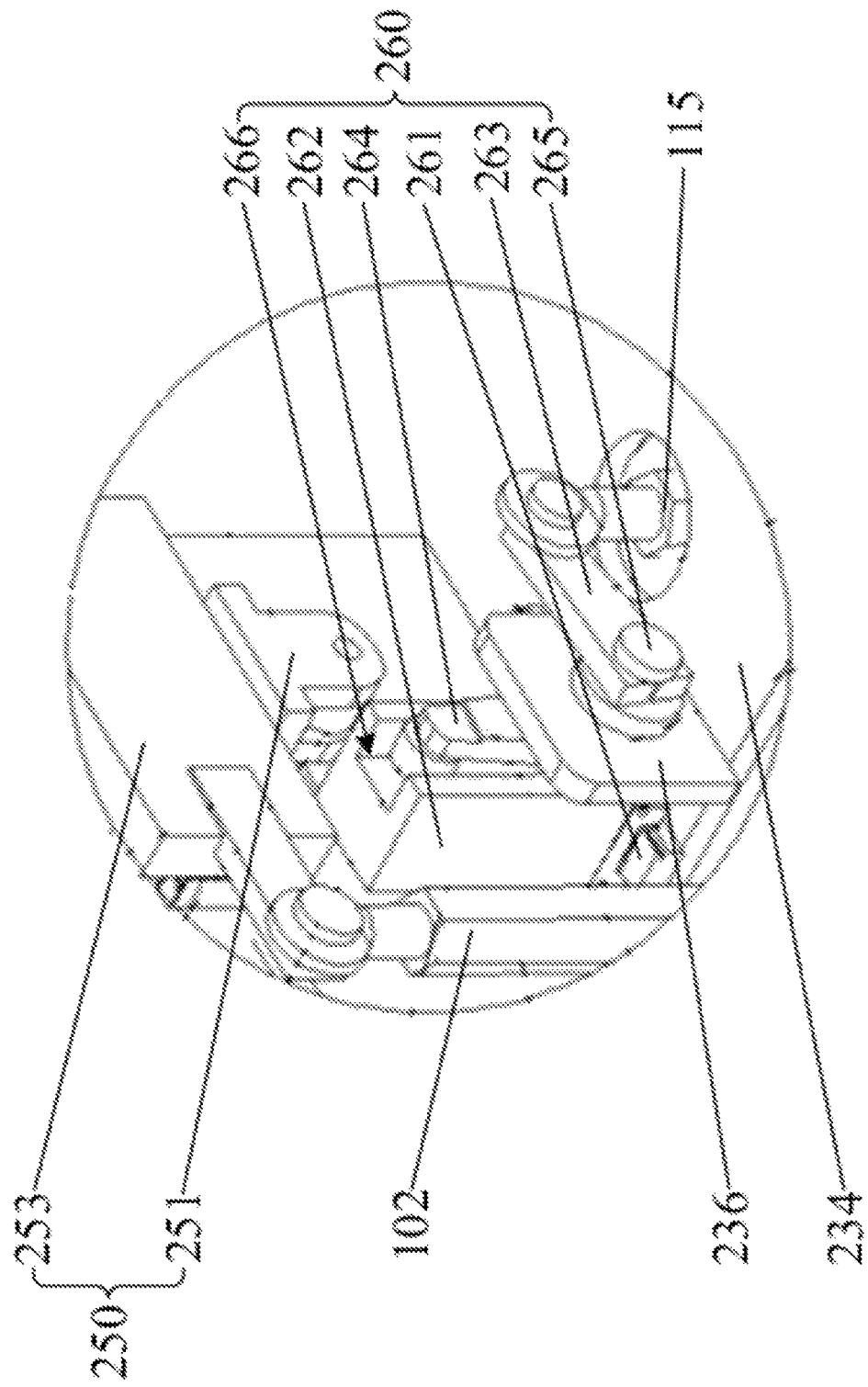
FIG. 8 is an enlarged partial view of part A of FIG. 1.

According to some embodiments of the present application and with reference to FIGS. 1, 4 and 8, the welding device further includes a first fixing component 220 and a second fixing component 250. The first fixing component 220 is connected with another end of the first connecting rod 101 and the welding head 103. The second fixing component 250 is connected to another end of the second connecting rod 102 and the welding base 104.

In this way, when the drive unit 210 drives the first fixed assembly 220 to move via the first connecting rod 101, the welding head 103 can be moved, and when the drive unit 210 drives the second fixed assembly 250 to move via the second connecting rod 102, the welding base 104 can be moved.

Figure 6:
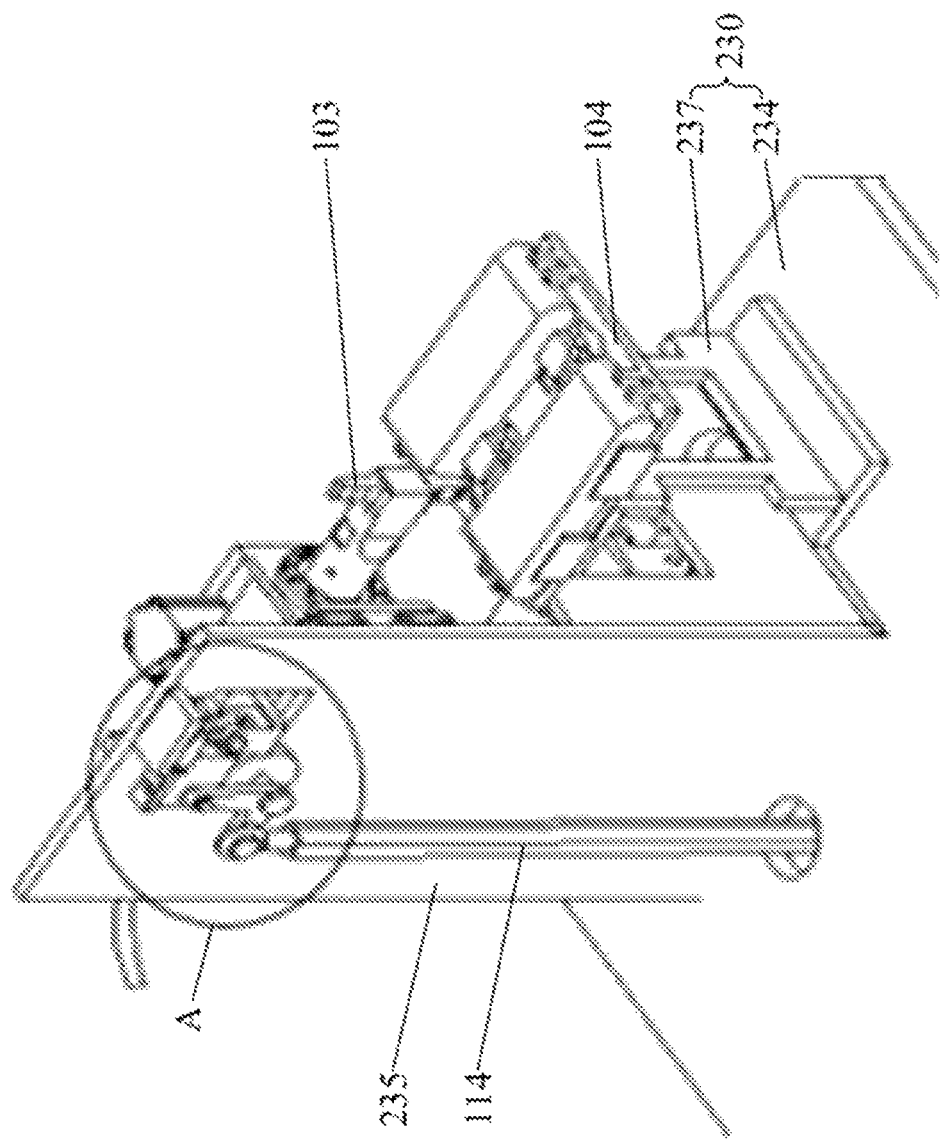
FIG. 6 is a structural schematic view from another perspective of a partial structure of the welding device according to some embodiments of the present application.
Figure 7:
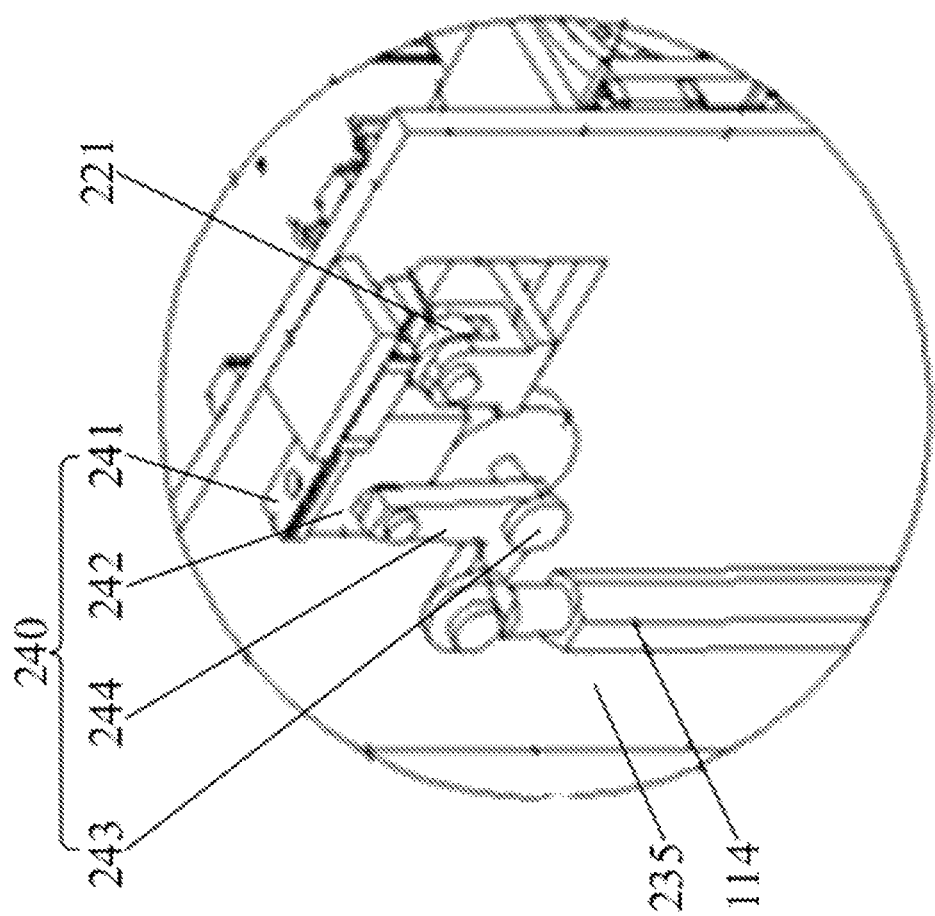
FIG. 7 is an enlarged partial view of part A of FIG. 6.

With continued reference to FIGS. 1 and 2, and also to FIGS. 6 and 7, according to some embodiments of the present application, the welding device further include a first supporting component or a first supporter 240. When the welding head 103 is moved in a direction closer to the welding base 104, the first supporting component 240 moves to a preset position and abuts against the first fixed assembly 220 to prevent the welding head 103 from moving in a direction away from the welding base 104.

In this way, after the drive unit 101 drives the first fixing component 220 to move via the first connecting rod 101, so as to bring the welding head 103 to move, the welding head 103 can be prevented from moving in the direction away from the welding base 104 by the first supporting component 240, so as to improve the stability of the welding head 103 while welding.

According to some embodiments of the present application, the welding device further includes a third connecting rod 114. The third connecting rod 114 is in driving connection to the drive unit 210 and the first supporting component 240, and is configured for causing, being driven by the drive unit 210, the first supporting component 240 to move.

In this way, while the drive unit 210 moves the first fixing component 220 via the first connecting rod 101 to move the welding head 103, the drive unit 210 can simultaneously move the first supporting component 240 via the third connecting rod 114 so that after the welding head 103 moves in the direction closer to the welding base 104, the first supporting component 240 can abut against the first fixing component 220 and prevent the welding head 103 from moving in the direction away from the welding base 104.

According to some embodiments of the present application, the first supporting component 240 includes a first guide rail 241 fixed on the positioning bracket 230, and a first supporting piece or a first supporting structure 242 slidably arranged on the first guide rail 241 and in driving connection to an end portion of the third connecting rod 114; and the third connecting rod 114 is configured for driving the first supporting piece 242 to slide on the first guide rail 241 and bringing the first supporting piece 242 against the first fixing component 220.

In this way, the drive unit 210 can drive the first supporting piece 242 to slide on the first guide rail 241 via the third connecting rod 114, and when the drive unit 210 moves the first fixing component 220 via the first connecting rod 101 to move the welding head 103, the first supporting piece 242 is made to abut against the first fixing component 220 to prevent the welding head 103 from moving in the direction away from the welding base 104, thereby improving the stability of the welding head 103 and the shaping plate 105 when the welding head 103 is being welded.

In one embodiment, a welding head support roller 221 is provided in the first fixing component 220 at an abutment for abutting the first supporting piece 242. When the first supporting piece 242 slides on the first guide rail 241 and abuts against the first fixing component 220, the first supporting piece 242 abuts against the welding head support roller 221 to reduce friction when the first supporting piece 242 abuts against the first fixing component 220.

According to some embodiments of the present application, the first supporting component 240 further includes a second stationary shaft 243 and an articulated connecting rod 244. The second stationary shaft 243 fixed on the positioning bracket 230. The articulated connecting rod 244 is rotatably disposed 243 on the second stationary shaft 243 in a circumferential direction of the second stationary shaft 243, and opposite ends of the articulated connecting rod 244 are respectively connected with one of the third connecting rod 114 and the first supporting piece 242.

In this way, the drive unit 210 can drive the articulated connecting rod 244 through the third connecting rod 114 to rotate circumferentially along the second stationary shaft 243 to slide the first supporting component 240 on the first guide rail 241 through the articulated connecting rod 244, so that the first supporting piece 242 can abut the first fixing component 220 and prevent the welding head 103 from moving in the direction away from the welding base 104.

Specifically, in one example, the articulated connecting rod 244 is rotationally connected to the third connecting rod 114. In another example, the first supporting piece 242 is provided with a slot, the end of the articulated connecting rod 244 and the first supporting piece 242 is embedded in the slot of the first supporting piece 242, and a roller bearing is arranged between the end of the articulated connecting rod 244 and the first supporting piece 242 and the wall surface of the slot, so as to reduce the friction between the articulated connecting rod 244 and the first supporting piece 242 when the articulated connecting rod 244 drives the first supporting piece 242 to move.

In one embodiment, the positioning bracket 230 also includes an upper plate 234 and a first side plate 235 fixed to the upper plate 234. The plate surface of the upper plate 234 intersects the plate surface of the first side plate 235, and the first guide rail 241 and the second stationary shaft 243 are both fixed to the first side plate 235. In one example, the upper plate 234 is fixed to the bottom plate 233 by a support frame (not shown), and the plate surface of the upper plate 234 is parallel to the plate surface of the bottom plate 233.

With continued reference to FIGS. 1 and 2, and also to FIGS. 8, according to some embodiments of the present application In, the welding device further includes a second fixing component 250. The second fixing component 250 is connected to another end of the second connecting rod 102 and the welding base 104. In this way, when the drive unit 210 drives the second connecting rod 102 to move, the welding base 104 can be moved by driving the second fixed assembly 250 to move.

According to some embodiments of the present application, the welding device further includes a second supporting component or a second supporter 260. when the welding base 104 moves in a direction closer to the welding head 103, the second supporting component 260 moves to a preset position and abuts against the second fixing component or the second fixer 250 to prevent the welding base 104 from moving in a direction away from the welding head 103.

In this way, after the drive unit 210 drives the second fixing component 250 to move via the second connecting rod 102, so as to bring the welding base 104 to move, and the welding base 104 can be prevented from moving in the direction away from the welding head 103 by the second supporting component 260, so as to improve the stability of the welding base 104 while the welding heat 103 is being welded.

According to some embodiments of the present application, the welding device further includes a fourth connecting rod 115. The fourth connecting rod 115 is in driving connection to the drive unit 210 and the second supporting component 260, and is configured for causing, being driven by the drive unit 210, the second supporting component 260 to move.

In this way, the drive unit 210 can drive the second fixing component 260 to move via the fourth connecting rod 115 while driving the second fixing component 250 to move via the second connecting rod 102, so as to bring the welding base 104 to move.

According to some embodiments of the present application, the second supporting component 260 includes a second guide rail 261 fixed on the positioning bracket 230, and a second supporting piece or a second supporting structure 262 slidably arranged on the second guide rail 261 and in driving connection to an end portion of the fourth connecting rod 115. The fourth connecting rod 115 is configured for driving the second supporting piece 262 to slide on the second guide rail 261 and bringing the second supporting piece 262 against the second fixing component 250.

In this way, the drive unit 210 can drive the second supporting piece 262 to slide on the second guide rail 261 through the fourth connecting rod 115, when the drive unit 210 drives the second fixing component 250 to move through the second connecting rod 102 so as to move the welding base 104, the second supporting member 262 is brought into contact with the second fixing component 250 to prevent the welding base 104 from moving in a direction away from the welding head 103, thereby improving the stability of the welding base 104 when the welding head 103 is welded.

In one embodiment, a welding base support roller 251 is provided at an abutment for abutting the second supporting piece 262 in the second fixing component 250. When the second supporting piece 262 slides on the second guide rail 261 and abuts against the second fixing component 250, the second supporting piece 262 abuts against the welding base support roller 251 to reduce friction when the second supporting piece 262 abuts against the second fixing component 250.

According to some embodiments of the present application, the second supporting component 260 further includes a first staging connecting rod 263, a second staging connecting rod 264 and a drive shaft 265. The second supporting piece 262 is provided with a third guide rail 266, and an extension direction of the third guide rail 266 intersects with an extension direction of the second guide rail 261. One end of the first staging connecting rod 263 and one end of the second staging connecting rod 264 are fixed with the drive shaft 265, another end of the first staging connecting rod 263 is in driving connection to an end portion of the fourth connecting rod 115, and another end of the second staging connecting rod 264 is slidably arranged on the third guide rail 266. The drive shaft 265 is rotatably arranged on the positioning bracket 230 in a circumferential direction of the positioning bracket.

Since the extension direction of the third guide rail 266 intersects the extension direction of the second guide rail 261. Therefore, when the second staging connecting rod 264 rotates in the circumferential direction along the drive shaft 265 and another end of the second staging connecting rod 264 slides on the third guide rail 266, the second supporting piece 262 can be caused to slide on the second guide rail 261. In one example, the extension direction of the third guide rail 266 is perpendicular to the extension direction of the second guide rail 261.

In this way, the drive unit 210 can drive the first staging connecting rod 263 to rotate circumferentially along the drive shaft 265 via the fourth connecting rod 115, and drive the second staging connecting rod 264 via the drive shaft 265 to rotate circumferentially along the drive shaft 265, and slide on the third guide rail 266 by means of the other end of the second staging connecting rod 264, causing the second supporting piece 262 to slide on the second guide rail 261, thereby allowing the second supporting piece 262 to abut the second fixing component 250 and preventing the welding base 104 from moving in a direction away from the welding head 103.

Specifically, in one example, the first staging connecting rod 263 and the fourth connecting rod 115 are rotationally connected. In another example, the third guide rail 266 is a groove provided on the second supporting piece 262, and a deep groove ball bearing is provided between another end of the second staging connecting rod 264 and the groove wall of the third guide rail 266 to reduce friction when another end of the second staging connecting rod 264 slides on the third guide rail 266.

In one embodiment, the positioning bracket 230 is further provided with a fixing seat 236 fixed to the upper plate 234, the second guide rail 261 is fixed to the upper plate 234, and the drive shaft 265 is rotatably arranged on the fixing seat 236.

Figure 9:
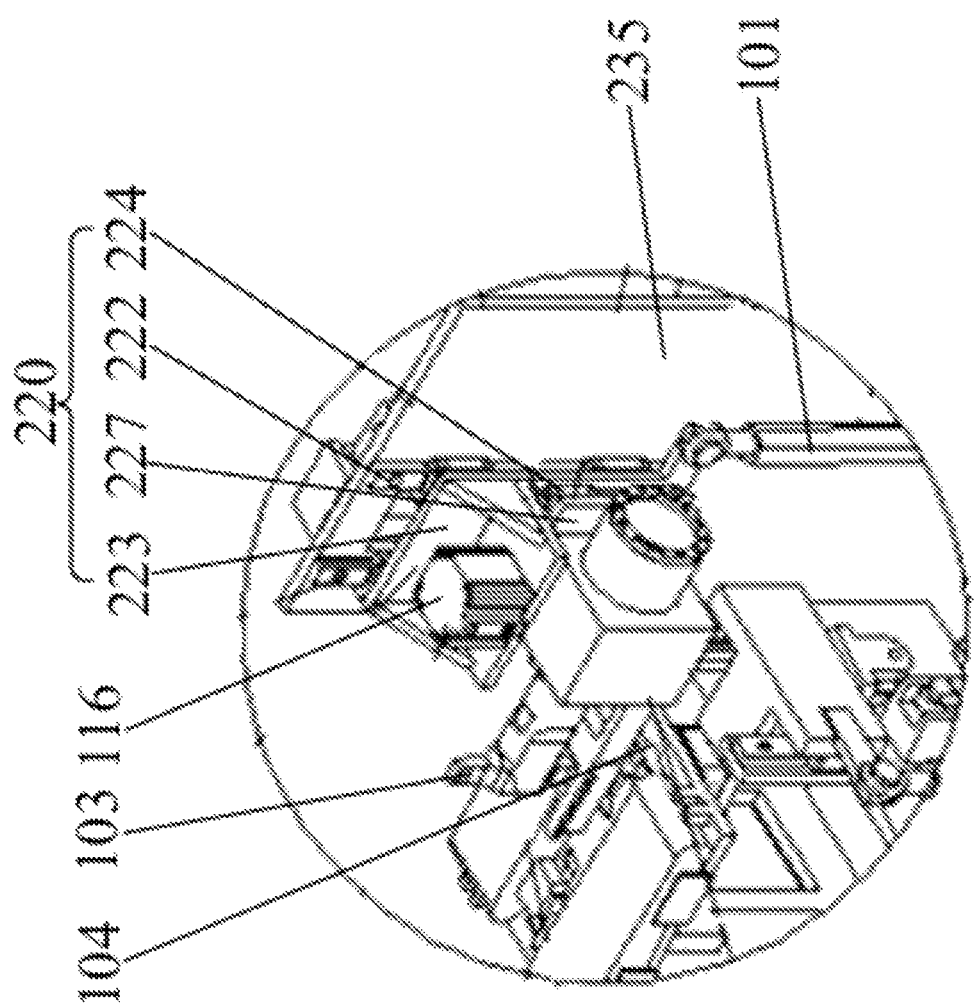
FIG. 9 is an enlarged partial view of part B of FIG. 1.

With continued reference to FIGS. 1-4, and also with reference to FIG. 9, according to some embodiments of the present application, the above-described welding device further includes a cylinder 116 coupled to the welding head 103 and configured for driving the welding head 103 to move in a direction closer to or away from the welding base 104. The another end of the first connecting rod 101 is in driving connection to the cylinder 116 and is configured for driving the cylinder 116 and the welding head 103 to move.

In this way, when the welding device is in use, and after the drive unit 210 drives both the welding head 103 and the welding base 104 to move, the welding head 103 can be driven by the cylinder 116 to weld the object to be welded.

According to some embodiments of the present application, the first fixing component 220 further includes a fourth guide rail 222 fixed to the positioning bracket 230. The cylinder 116 is slidably arranged on the fourth guide rail 222 and capable of sliding, being driven by the first connecting rod 101, on the fourth guide rail 222.

In this way, when the drive unit 210 drives the cylinder 116 to move via the first connecting rod 101, it enables the cylinder 116 to move on the fourth guide rail 222 to improve the stability of the cylinder 116 when it moves. In one embodiment, the fourth guide rail 222 includes two parallel rails, and the cylinder 116 is slidable on the two rails of the fourth guide rail 222, thereby further improving the stability of the cylinder 116 when moving.

According to some embodiments of the present application, the first fixing component 220 further includes a cylinder fixing piece or a cylinder fixing structure 223 and a fifth guide rail 224. The cylinder fixing piece 223 is slidably arranged on the fourth guide rail 222, and the cylinder fixing piece 223 is in driving connection to the another end of the first connecting rod 101. The fifth guide rail 224 is fixed on the cylinder fixing piece 223. The welding head 103 is slidably arranged on the fifth guide rail 224. The cylinder 116 is fixed on the cylinder fixing piece 223 and is configured for driving the welding head 103 to slide on the fifth guide rail 224.

In this way, when the cylinder 116 drives the welding head 103 to move in the direction closer to or away from the welding base 104, it enables the welding head 103 to move on the fifth guide rail 224 to improve the stability of the welding head 103 when it moves.

In this way, when the cylinder 116 drives the welding head 103 to move in the direction close to or away from the welding base 104, it enables the welding head 103 to move on the fifth guide rail 224 to improve the stability of the welding head 103 when it moves.

Specifically, in one embodiment, the fifth guide rail 224 includes two parallel rails, and the welding head 103 is slidable on the two rails of the fifth guide rail 224, thereby further improving the stability of the welding head 103 when moving. In another embodiment, the cylinder fixing piece 223 is rotationally connected to another end of the first connecting rod 101.

In some embodiments, the first fixing component 220 further includes a welding head fixing piece 225. The welding head fixing piece 225 is slidably disposed on the fifth guide rail 224, and the welding head 103 is fixed on the welding head fixing piece 225. For example, the first fixing component 220 further includes a shaping plate fixing piece 226. The shape plate fixing piece 226 is fixed to the cylinder fixing piece 223, and the shaping plate 105 that is fixed to the shaper fixing piece 226 with a space therebetween. In one example, the first fixing component 220 further includes a fixing upright plate 227. The fixing upright plate 227 is slidably disposed on the fifth guide rail 224, and the welding head fixing piece 225 is fixed on the fixing upright plate 227.

According to some embodiments of the present application, the second fixing component 250 further includes a sixth guide rail 252 fixed to the positioning bracket 230. The welding base 104 is slidably arranged on the sixth guide rail 252 and capable of sliding, being driven by the second connecting rod 102, on the sixth guide rail 252.

In this way, when the drive unit 210 drives the welding base 104 to move through the second connecting rod 102, it enables the welding base 104 to move on the sixth guide rail 252 to improve the stability of the welding base 104 when it moves. In one embodiment, the sixth guide rail 252 includes two parallel rails, and the welding base 104 is slidable on the two rails of the sixth guide 252, thereby further improving the stability of the welding base 104 when moving. In another embodiment, the second fixing component 250 further includes a welding base fixing piece 253. The welding base 104 is fixed to the welding base fixing piece 253. The welding base fixing piece 253 is slidably disposed on the sixth guide rail 252, and the welding base fixing piece 253 is rotationally connected to another end of the second connecting rod 102.

In one embodiment, the positioning bracket 230 is further provided with a second side plate 237, the surface of the second side plate 237 intersects the surface of the upper plate 234, the second side plate 237 is fixed to the upper plate 234, and the sixth guide rail 252 is fixed to the second side plate 237.

With continued reference to FIGS. 2 and 5, according to some embodiments of the present application, the welding device further includes a transmission connecting rod 117, a drive connecting rod 118, and a third stationary shaft 119 fixed to the positioning bracket 230. The transmission connecting rod 117 is provided on the third stationary shaft 119, so as to be rotatable along the circumferential direction of the third stationary shaft 119. Both ends of the drive connecting rod 118 are in driving connection to one of the transmission connecting rod 117 and the drive unit 210. One end of the first connecting rod 101 or one end of the second connecting rod 102 is connected with the transmission connecting rod 117.

In this way, when the drive unit 210 drives the drive connecting rod 118 to move, it drives the transmission connecting rod 117 to rotate circumferentially along the third stationary shaft 119 and drives the first connecting rod 101 or the second connecting rod 102 to move via the transmission connecting rod 117, thereby driving the welding head 103 or welding base 104 to move. In one embodiment, the third stationary shaft 119 is located between the drive connecting rod 118 and the first connecting rod 101, or the third stationary shaft 119 is located between the drive connecting rod 118 and the second connecting rod 102.

Specifically, in one embodiment, the number of the transmission connecting rods 117, the drive connecting rods 118 and the third stationary shafts 119 are two, and the drive unit 210 drives the two drive connecting rods 118 to move through the output shaft 108, the two cams 107 and the two drive rods 110, thereby driving one of the first connecting rod 101 and the second connecting rod 102 to move through the two drive connecting rods 118 and the two transmission connecting rods 117, respectively.

In some embodiments, the drive unit 210 may drive the third connecting rod 114 and the fourth connecting rod 115 in the same manner as the first connecting rod 101 and the second connecting rod 102 in the previous embodiments. Specifically, the drive unit 210 moves one of the third connecting rod 114 and the fourth connecting rod 115 via the output shaft 108, the two cams 107, the two drive rods 110, the two drive connecting rods 118, and the two transmission connecting rods 117, respectively. In another embodiment, the two cams 107 driving the third connecting rod 114 and the fourth connecting rod 115 are closed cams to ensure that the first supporting component 240 can contact the first fixed assembly 220 and the second supporting component 260 can contact the second fixed assembly 250 after the drive unit 210 drives the third connecting rod 114 and the fourth connecting rod 115 to move.

In some embodiments, the positioning bracket 230 further includes a support seat 238 secured to the side of the upper plate 234 adjacent to the bottom plate 233, and the third stationary shaft 119 is secured to the support seat 238. In one embodiment, the support seat 238 is double support seats, which are respectively arranged at both ends of the third stationary shaft 119 and connected with the third stationary shaft 119, wherein the transmission connecting rod 117 arranged on the third stationary shaft 119 is used for driving the third connecting rod 114 or the fourth connecting rod 115 to move.

In some embodiments, the displacement of the head 103 and the base 104 when the drive unit 210 is driven may be adjusted by adjusting the lengths of the first connecting rod 101, the second connecting rod 102, the third connecting rod 114, and the fourth connecting rod 115.

In one particular embodiment, the present application provides a welding device When the welding head 103 and the welding base 104 need to be moved synchronously, the motor 211 drives the output shaft 108 to rotate via the synchronous belt 212 to rotate the four cams 107, and each of the four cams 107 drives the first connecting rod 101, the second connecting rod 102, the third connecting rod 114 and the fourth connecting rod 115 to move via the transmission connecting rod 110, the drive connecting rod 118 and the transmission connecting rod 117, thereby driving the welding head 103 and the welding base 104 to move and causing the first supporting piece 242 to abut the welding head 103 against the welding head support roller 221 of the first fixing component 220 fixing the welding head 103 to prevent the welding head 103 from moving in a direction away from the welding base 104, and the second supporting piece 262 to abut the welding head 103 against the welding head support roller 251 of the second fixing component 250 fixing the welding base 104 to prevent the welding base 104 from moving in a direction away from the welding head 103. In addition, when the welding device performs welding, the welding head 103 and the shaping plate 105 can be simultaneously driven by the cylinder 116 to move, so that welding is performed by the welding head 103 and shaping is performed by the shaping plate 105.

Finally, it should be noted that the above embodiments are only used to illustrate the technical solution of the present application, not to limit it. Although the present applicant has been described in detail with reference to the foregoing embodiments, it should be understood by those of ordinary skill in the art that the technical solution described in the foregoing embodiments can still be modified or some or all of the technical features thereof can be equivalently replaced. However, these modifications or substitutions do not depart the essence of the corresponding technical solution from the scope of the technical solution of each embodiment of the present application, and should be covered in the scope of the claims and descriptions of the present application. In particular, the various technical features mentioned in the various embodiments may be combined in any manner so long as there is no structural conflict. The present application is not limited to the specific embodiments disclosed herein but includes all technical solutions falling within the scope of the claims.

What is claimed is:

1. A welding device, comprising: a driver, a first connecting rod, a second connecting rod, a welding head, a welding base, two cams and one output shaft being in driving connection to the driver and mated with the two cams;
   wherein the driver is in driving connection to one end of the first connecting rod and one end of the second connecting rod;
   another end of the first connecting rod is in driving connection to the welding head, and is configured to be driven by the driver to cause the welding head to move in a direction closer to or away from the welding base;
   another end of the second connecting rod is in driving connection to the welding base, and is configured to be driven by the driver to cause the welding base to move in a direction closer to or away from the welding head;
   the first connecting rod and the second connecting rod are parallel to each other; and
   the one end of the first connecting rod and the one end of the second connecting rod are connected with one of the two cams.

2. The welding device according to claim 1, further comprising a shaping plate; wherein the shaping plate is in driving connection to the another end of the first connecting rod; and the first connecting rod is driven by the driver to drive the welding head and the shaping plate to move.

3. The welding device according to claim 2, further comprising a first fixer; wherein the first fixer is connected with the another end of the first connecting rod, the welding head and the shaping plate, and the shaping plate and the first fixer are provided with spacing, the spacing being increased or decreased.

4. The welding device according to claim 3, further comprising an elastic structure; wherein the elastic structure is located between the first fixer and the shaping plate: when the spacing is decreased, the elastic structure is elastically deformed under extrusion of the first fixer and the shaping plate.

5. The welding device according to claim 1, wherein the output shaft penetrates through and is fixed to the two cams.

6. The welding device according to claim 1, further comprising a first stationary shaft and two drive rods; wherein the first stationary shaft is axially parallel to the output shaft; the two drive rods are rotatably disposed on the first stationary shaft in a circumferential direction of the first stationary shaft; the two drive rods each comprise a connecting part and a drive part, and two drive parts are respectively in driving connection to one of the two cams; and one end of the first connecting rod and one end of the second connecting rod are in driving connection to one connecting part.

7. The welding device according to claim 1, further comprising a first fixer connected with the another end of the first connecting rod and the welding head; and a second fixer connected with the another end of the second connecting rod and the welding base.

8. The welding device according to claim 7, further comprising a first supporter; wherein when the welding head moves in a direction closer to the welding base, the first supporter moves to a preset position and abuts against the first fixer to prevent the welding head from moving in a direction away from the welding base.

9. The welding device according to claim 8, further comprising a third connecting rod; wherein the third connecting rod is in driving connection to the driver and the first supporter, and is configured to be driven by the driver to cause the first supporter to move.

10. The welding device according to claim 9, further comprising a positioning bracket fixed to the driver; wherein the first supporter comprises: a first guide rail fixed on the positioning bracket, and a first supporting structure slidably arranged on the first guide rail and in driving connection to an end portion of the third connecting rod; and the third connecting rod is configured for driving the first supporting structure to slide on the first guide rail and bringing the first supporting structure against the first fixer.

11. The welding device according to claim 10, wherein the first supporter further comprises: a second stationary shaft fixed on the positioning bracket; and an articulated connecting rod rotatably disposed on the second stationary shaft in a circumferential direction of the second stationary shaft, and opposite ends of the articulated connecting rod being respectively connected with one of the third connecting rod and the first supporting structure.

12. The welding device according to claim 7, further comprising a second supporter; wherein when the welding base moves in a direction closer to the welding head, the second supporter moves to a preset position and abuts against the second fixer to prevent the welding base from moving in a direction away from the welding head.

13. The welding device according to claim 12, further comprising a fourth connecting rod; wherein the fourth connecting rod is in driving connection to the driver and the second supporter, and is configured to be driven by the driver to cause the second supporter to move.

14. The welding device according to claim 13, further comprising a positioning bracket fixed to the driver; wherein the second supporter comprises: a second guide rail fixed on the positioning bracket, and a second supporting structure slidably arranged on the second guide rail and in driving connection to an end portion of the fourth connecting rod: and the fourth connecting rod is configured for driving the second supporting structure to slide on the second guide rail and bringing the second supporting structure against the second fixer.

15. The welding device according to claim 14, wherein the second supporter further comprises: a first staging connecting rod, a second staging connecting rod, and a drive shaft; wherein the second supporting structure is provided with a third guide rail, and an extension direction of the third guide rail intersects with an extension direction of the second guide rail; one end of the first staging connecting rod and one end of the second staging connecting rod are fixed with the drive shaft, another end of the first staging connecting rod is in driving connection to the end portion of the fourth connecting rod, and another end of the second staging connecting rod is slidably arranged on the third guide rail; and the drive shaft is rotatably arranged on the positioning bracket in a circumferential direction of the positioning bracket.

16. The welding device according to claim 1, further comprising a cylinder coupled to the welding head and configured for driving the welding head to move in a direction closer to or away from the welding base; and the another end of the first connecting rod is in driving connection to the cylinder and is configured for driving the cylinder and the welding head to move.

17. The welding device according to claim 16, further comprising a positioning bracket and a fourth guide rail fixed to the positioning bracket; and the cylinder is slidably arranged on the fourth guide rail and capable of being driven by the first connecting rod to slide on the fourth guide rail.

18. The welding device according to claim 17, further comprising a cylinder fixing structure and a fifth guide rail; wherein the cylinder fixing structure is slidably arranged on the fourth guide rail, and the cylinder fixing structure is in driving connection to the another end of the first connecting rod; the fifth guide rail is fixed on the cylinder fixing structure; the welding head is slidably arranged on the fifth guide rail; and the cylinder is fixed on the cylinder fixing structure and is configured for driving the welding head to slide on the fifth guide rail.

19. The welding device according to claim 1, further comprising a positioning bracket and a sixth guide rail fixed to the positioning bracket; wherein the welding base is slidably arranged on the sixth guide rail and capable of sliding, being driven by the second connecting rod, on the sixth guide rail.

20. The welding device according to claim 1, further comprising a transmission connecting rod, a drive connecting rod, a positioning bracket, and a third stationary shaft fixed to the positioning bracket; wherein the transmission connecting rod is rotatably arranged on the third stationary shaft in a circumferential direction of the third stationary shaft; two ends of the drive connecting rod are respectively in driving connection to one of the transmission connecting rod and the driver; and one end of the first connecting rod or one end of the second connecting rod is connected with the transmission connecting rod.

* * * * *